Nov. 6, 1934.  I. HECHENBLEIKNER  1,979,544
METHOD OF STORING OXIDES OF NITROGEN
Filed Sept. 16, 1931
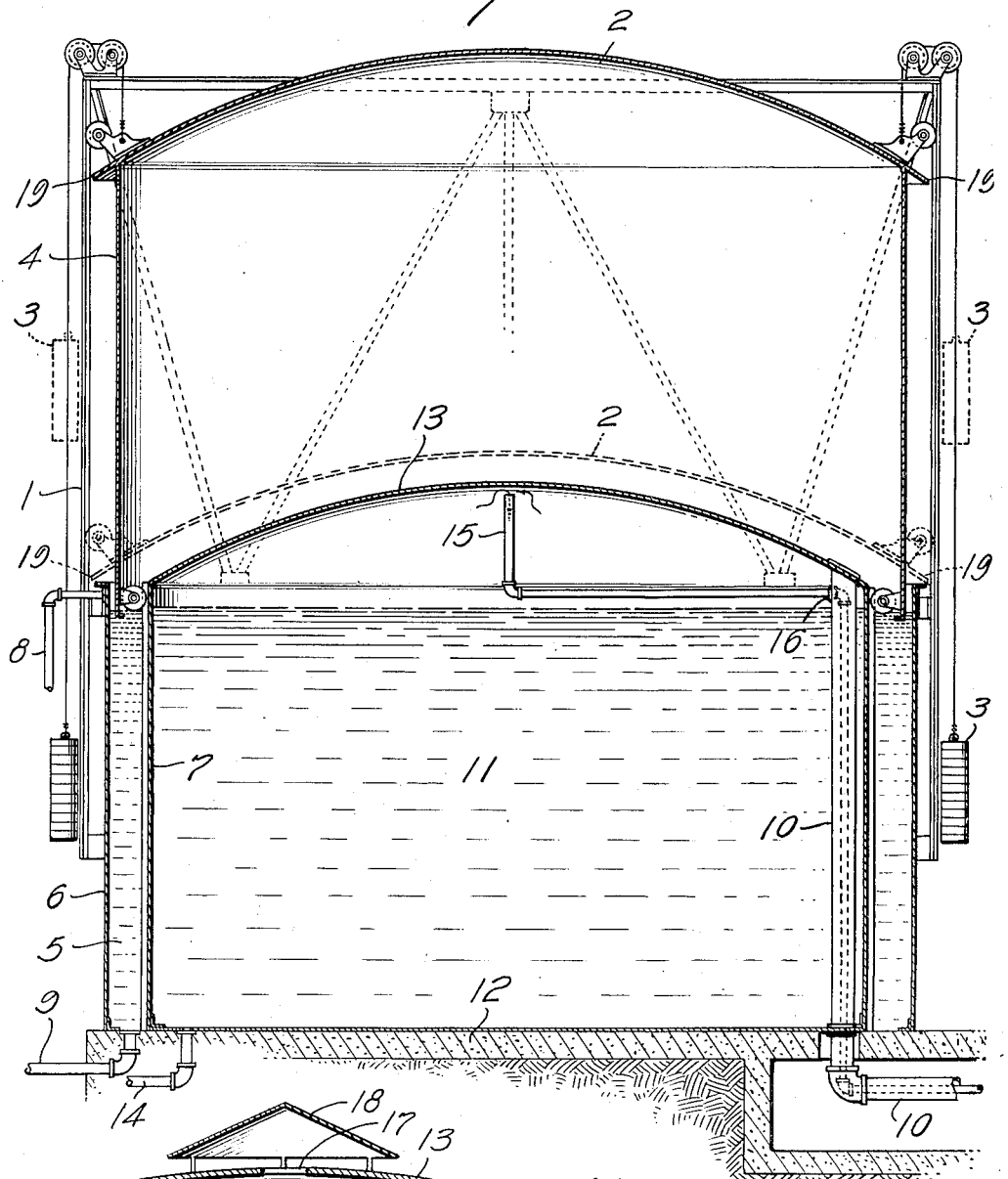
Inventor
INGENUIN HECHENBLEIKNER, Patented Nov. 6, 1934

1,979,544

UNITED STATES PATENT OFFICE 1,979,544

METHOD OF STORING OXIDES OF NITROGEN

Ingenuin Hechenbleikner, Charlotte, N. C., assignor to Chemical Construction Corporation, New York, N. Y., a corporation of Delaware Application September 16, 1931, Serial No. 563,138

3 Claims. (Cl. 23—157)

The present invention relates to a combined gas holder and liquid storage tank particularly designed for the storage of oxides of nitrogen and nitric acid respectively, although not limited thereto, as the invention may be obviously applied to any circumstances where it is desired to store liquids and gases.

In processes for producing nitric acid from oxides of nitrogen and in nitrating plants generally, large quantities of oxides of nitrogen are handled. In nitrating plants, for instance, it is very difficult to control the liberation of oxides of nitrogen with any regularity. Many of these nitrating plants provide nitric acid manufacturing plants in conjunction therewith to recover these valuable waste nitrogen oxide gases. Due to the fact that the supply of oxides of nitrogen fluctuates, it has been necessary either to provide a nitric acid plant of sufficient capacity to take care of the maximum gas production or to provide a smaller nitric acid plant with means to vent the excess gas to the air. Both of these systems are undesirable from the standpoint of unnecessary expense, and the latter is also particularly objectionable in that the vented oxides of nitrogen are harmful to the community contiguous to the plant.

The invention has particular reference to such plants where nitric acid is being or may be produced from oxides of nitrogen regardless as to whether the supply of the latter fluctuates or not. The invention contemplates the provision of a gas holder or storage tank for the oxides of nitrogen which, if the supply of the latter fluctuates, will effectively take care of the excess and insure an even flow of the gases to the nitric acid plant.

In gas holders generally involving the use of a counter-weighted dome which moves vertically as gas is fed thereinto or removed therefrom, there is available for a liquid storage tank the same ground area covered by the dome. The invention, therefore, contemplates that a liquid storage tank be provided directly beneath the gas holder dome, this being possible simply by providing a liquid-tight bottom in the space beneath the dome. The tank proper may be sunk into the ground so that the top thereof is substantially flush with the ground surrounding the gas holder, although when the entire tank is above ground it becomes possible to readily detect and repair leaks.

The use of such a liquid storage tank for nitric acid is particularly advantageous in connection with a gas holder adapted to receive oxides of nitrogen in that the displaced nitric acid vapors moving out of the liquid storage tank as nitric acid is fed thereinto, may be vented directly into the gas holder containing the oxides of nitrogen above the same. This insures against any loss of the vaporized nitric acid. Any condensation within the gas holder may be made to run down the sides of the same into the body of sealing liquid from the open bottom of the dome and this liquid may conveniently be a dilute nitric acid. Inasmuch as the invention contemplates the utilization of this weak acid as the absorbing medium for the oxides of nitrogen in the nitric acid production end of the system, there is a completely closed cycle of operations and neither the oxides of nitrogen, condensed nitric acid therefrom, vaporized nitric acid from the nitric acid storage tank or overflow from the latter will be lost.

The invention further contemplates the novel combination, construction and arrangement of parts more fully hereinafter described and shown in the accompanying drawing.

In the drawing:

Fig. 1 is a sectional elevational view of a combined gas holder and liquid storage tank constructed according to this invention.

Fig. 2 is a sectional detail view of a modified form of vent for the liquid storage tank.

Referring now with particularity to the embodiment illustrated in Fig. 1, there is shown at 1 the usual framework which carries the vertically movable dome 2 of a gas holder suitably counter-weighted as at 3 for vertical movement in the usual manner. The dome 2 has the lower end of its walls 4 dipping into the body of sealing liquid 5 located between an outer wall 6 and an inner wall 7 constituting a sealing liquid compartment.

An overflow 8 is provided near the top of the sealing liquid compartment to prevent loss through spillage of the sealing liquid 5 and a drain is shown at 9 through which this sealing liquid may be removed when found necessary or desirable.

Suitable provision is made for supplying gas to and from the holder which may conveniently consist of the large diameter pipe 10.

Located directly beneath the dome 2 is a liquid storage tank indicated generally at 11, which is constituted by the inner walls 7 of the sealing liquid chamber for the gas holder, the liquid-tight bottom 12 and the curved top 13. A liquid inlet and outlet may be provided for the liquid storage tank in the pipe 14 at the bottom thereof. Displaced atmosphere in the liquid tank may pass out of the same through the pipe 15, the open top of which is located just beneath the top of the curved cover 13 and this pipe 15 may conveniently pass into the gas outlet pipe 10 as at 16, down the inside thereof and to a suitable receptacle. Where nitric acid is stored in the liquid tank 11 and oxides of nitrogen are contained within the gas holder, this atmosphere may be discharged directly into the gas holder. Such a construction is shown in Fig. 2 where a hole 17 is provided in the top 13 of the liquid storage tank and this hole may be suitably protected by a canopy or the like 18. In such a case, the pipe 15 serves solely to remove the overflow acid where the feed into the tank is greater than the outflow. On the other hand, the presence of this pipe 15 is not absolutely essential for the reason that such incidental acid overflow as may exist may also flow through the hole 17, run down the dome top 13 of the storage tank and into the body of dilute acid 5 contained in the liquid sealing compartment for the gas holder. Inasmuch as it is contemplated that this dilute acid will be used as an absorbing medium for the oxides of nitrogen in the production of nitric acid, this overflowing strong acid will not be lost but will eventually find its way back into the cycle of operations.

It is desirable that the dome 2 of the gas holder be provided with an overhanging ledge 19 so that any rainwater dripping therefrom will not unduly dilute the acid used in the sealing compartment for the gas holder.

Any condensation of nitric acid on the inner walls of the top of the gas holder will trickle down the same and join the body of weak acid 5.

This acid, therefore, is made by the present invention to serve both as a seal for the lower edge of the gas holder and as an absorbing or collecting medium for any condensate containing oxides of nitrogen, particularly higher oxides such as $NO_2$ and $N_2O_4$, that may condense on the walls of the gas holder. Although the use of a relatively weak acid has been described for this purpose, it is apparent that stronger acid may be used so long as it is still capable of absorbing oxides of nitrogen, and in the following claims the term "nitric acid capable of being further fortified" is used to define a nitric acid having this characteristic. Similarly the term "oxides of nitrogen" is intended to define a gas mixture, such as those obtained from nitrating plants, containing a substantial proportion of higher oxides of nitrogen.

Where the combined apparatus is to be used for the storage of oxides of nitrogen and nitric acid, it will be found desirable to construct the same of such materials as a chrome iron alloy which is substantially non-corrodible by nitric acid. In order to minimize the number of holes made through this material for the accommodation of the various in-takes and off-takes, the acid overflow and displaced gas outlet pipe 15 may pass out of the liquid storage tank through the same hole used for the gas inlet and outlet 10 as shown in Fig. 1.

The provision of this combination gas holder and liquid storage tanks makes possible in the cycle of operations including the production of nitric acid from oxides of nitrogen, the steady supply of gas for efficient operation by providing a gas storage means by utilizing part of the apparatus for the storage of the nitric acid without additional floor or ground space.

The inclusion of a nitric acid storage tank as part of the gas holder as above described is particularly advantageous where high-priced chrome iron alloys are used, for the reason that it only becomes necessary to use a comparatively small additional amount of this alloy to form the bottom 12 of the tank with or without the addition of the top 13, the inner wall 7 of the liquid sealing compartment for the gas holder being made to serve the dual capacity of constituting part of the sealing liquid compartment and the side walls of the nitric acid storage tank. This makes unnecessary the provision of a separate and distinct nitric acid storage tank apart from the gas holder.

While in the preferred construction a roof or top 13 is provided on the liquid storage tank in order to prevent the condensed weak acid from the gas holder above from falling into and diluting the stronger acid in the storage tank, yet this roof may be entirely omitted if the acid stored is to be of a strength less than 40% nitric acid. Of course, the presence of the roof materially assists in preventing undue loss of evaporated nitric acid.

I claim:

1. A closed cycle of operations in the manufacture of nitric acid from oxides of nitrogen and dilute nitric acid as the absorbing medium, comprising storing a body of concentrated nitric acid in a liquid holding tank, storing oxides of nitrogen in a holder superimposed on said liquid storage tank, condensing any nitric acid vapor escaping from the liquid storage tank on the walls of the gas holder, collecting such condensate in a body of dilute nitric acid, and using said dilute nitric acid as the absorbing liquid to absorb the oxides of nitrogen to form more nitric acid.

2. In the production of nitric acid by the absorption of oxides of nitrogen in dilute nitric acid, the steps which consist in storing said oxides of nitrogen in a bell-type gas holder and maintaining a seal around the lower edge of said holder consisting of nitric acid capable of being further fortified, whereby condensate from the inner walls of the holder will be collected in said acid.

3. In the production of nitric acid by the absorption of oxides of nitrogen in dilute nitric acid, the steps which comprise storing a body of nitric acid in a liquid holding tank, storing oxides of nitrogen in a bell-type holder superimposed on said liquid holding tank, and maintaining a seal around the lower edge of said holder consisting of nitric acid capable of being further fortified, whereby condensate from the inner walls of the holder will be collected in said sealing acid.

INGENUIN HECHENBLEIKNER.